United States Patent [19]

Hutchinson

[11] Patent Number: 5,739,905
[45] Date of Patent: Apr. 14, 1998

[54] SPECTROPHOTOMETER WITH ELECTRONIC TEMPERATURE STABILIZATION

[75] Inventor: Robert J. Hutchinson, Pittsford, N.Y.

[73] Assignee: Lucid Technologies, Inc., Henrietta, N.Y.

[21] Appl. No.: 806,825

[22] Filed: Feb. 26, 1997

[51] Int. Cl.$^6$ .................................. G01J 3/06; G01J 3/18
[52] U.S. Cl. ........................... 356/319; 356/328; 356/334
[58] Field of Search ................................ 356/319, 326, 356/328, 332, 334, 51; 250/339.03, 339.04

[56] References Cited

U.S. PATENT DOCUMENTS

| | | |
|---|---|---|
| 1,797,519 | 3/1931 | Brown et al. . |
| 2,240,207 | 4/1941 | Crawford . |
| 2,338,518 | 1/1944 | Koch . |
| 2,562,525 | 7/1951 | Cary et al. ............................. 356/51 |
| 3,445,743 | 5/1969 | Blair . |
| 3,582,712 | 6/1971 | Blair . |
| 3,717,804 | 2/1973 | Dikinis et al. . |
| 3,774,096 | 11/1973 | Hann . |
| 3,959,692 | 5/1976 | Wetzel . |
| 4,135,122 | 1/1979 | Holmquist et al. . |
| 4,195,324 | 3/1980 | Waltz . |
| 4,355,269 | 10/1982 | Burton et al. . |
| 4,375,757 | 3/1983 | Amsdill et al. . |
| 4,589,826 | 5/1986 | Zimmern et al. . |
| 4,638,643 | 1/1987 | Sakazume et al. . |
| 4,808,896 | 2/1989 | Katsuragi et al. . |
| 4,811,567 | 3/1989 | Bakanowski et al. . |
| 5,071,250 | 12/1991 | McGee . |
| 5,172,754 | 12/1992 | Graber et al. . |
| 5,258,698 | 11/1993 | Piovano et al. . |
| 5,384,448 | 1/1995 | Kubasko . |
| 5,502,362 | 3/1996 | Brandes . |

FOREIGN PATENT DOCUMENTS

WO 96/12166  4/1996  WIPO .

*Primary Examiner*—F. L. Evans
*Attorney, Agent, or Firm*—M. Lukacher; K. Lukacher

[57] ABSTRACT

In order to preclude unreliable or inaccurate spectrophotometric measurements which can be caused by thermal effects (expansion/contraction) of components of the spectrophotometer, such as the dispersive element, the arm or mounting for changing the orientation of the element to scan the spectrum and produce spectral measurements, the element, and also displacement of the photodetector, lenses and other optical elements which can caused thermal effects, and also to reduce temperature-related errors in the photodetector or other electronics of the spectrophotometer, a temperature sensor is disposed in thermally coupled relationship within the spectrophotometer housing. A motor, which is coupled to the arm to change the orientation of the element and to the motor controller, is programmed to utilize the motor as a heat source in response to the temperature of the spectrophotometer detected by the sensor when the motor is not actuating the element grating to provide spectral measurements.

4 Claims, 3 Drawing Sheets

SPECTROPHOTOMETER WITH ELECTRONIC TEMPERATURE STABILIZATION

DESCRIPTION

The present invention relates to spectrophotometers which utilize a motor for actuating a spectrally dispersive element so as to direct light of different wavelengths or in different wavelength bands to a photodetector and which provides for temperature stabilization of the spectrophotometer by operating the motor as a heat source when it is not actuating the element. More particularly, the invention provides a system for stabilizing the temperature of a spectrophotometer thereby reducing thermally induced effects which can adversely affect spectral measurements.

It is a feature of the invention to provide a temperature stabilization system for a spectrophotometer in which the position of a dispersive element is controlled by a motor and having electronic circuitry, for example, a microprocessor, which provides control signals for positioning the motor, which senses the temperature of the spectrophotometer and utilizes the motor, when the motor is not involved in spectral measurements, to provide for heating of the spectrophotometer thereby stabilizing the temperature thereof and reducing thermally related spectral measurement errors.

Thermally induced measurement errors have been recognized in spectrophotometers. It has been proposed to reduce thermal effect which give rise to such errors, by mechanical construction of the spectrophotometer, for example, the using of mountings with controlled thermal expansion and contraction characteristics and materials with high thermal conductivity to dissipate heat and thereby prevent thermal changes in a grating which can cause spectral measurement errors if the grating or its mounting expanded or contracted. Such a proposal is set forth in U.S. Pat. No. 5,319,437, issued Jun. 7, 1994 to VanAken, et al. Such mechanical construction tends to increase the cost of the spectrophotometer as well as its size and weight and has not been completely satisfactory. U.S. Pat. No. 5,017,250, issued to McGee on Dec. 10, 1991 proposes to control the speed of a fan to control the temperature of a spectrophotometer. This proposal is not compatible with portable, hand-held spectrophotometers. It has been recognized that thermal stabilization is required in various apparatus, for example motors or other electrical machinery which, if cold, has start up characteristics which can cause damage to the motor. For example, if the bearings of the motor are cold, the viscosity thereof will place an excessive drag on the motor on startup and can cause the motor to draw excessive current, damaging either the motor or its control circuits. It has been proposed to use motor windings as heater coils and to lock a motor so that it produces heat rather than motion, then heating of the motor and its environment. Such proposals are for example, set forth in U.S. Pat. No. 5,172,754, issued Dec. 22, 1992 to Grayber, et al., 5,384,448, issued Jan. 25, 1995 to Kubasko and 5,502,3628, issued Mar. 26, 1996 to Brandes.

The present invention provides an improved spectrophotometer which uses the equipment existing in the spectrophotometer for electronically controlled temperature stabilization. No special motor mountings are used and a low cost spectrophotometer, such as shown in International (PCT.) application WO96/12166 of Apr. 25, 1996 which corresponds to U.S. patent application Ser. No. 08/322,244, issued Oct. 12, 1994, which by this reference are both incorporated herein—may be retrofitted so as to provided electronic temperature stabilization.

Accordingly, it is the principal object of the present invention to provide an improved spectrophotometer with electronically controlled temperature stabilization.

It is a further object of the present invention to provide an improved spectrophotometer which utilizes the motor, which actuates the dispersive element to obtain spectral measurements at different wavelengths or in wavelength bands of illumination as a heat source without interference with the operation of the motor in obtaining the spectral measurements.

It is a still further object of the present invention to provide an improved spectrophotometer which can be retrofitted to provide temperature stabilization in that the motor and motor control circuit of the spectrophotometer provides with a temperature sensor, for the electronic control of temperature of the spectrophotometer.

The foregoing and other object features and advantages will become more apparent from a reading of the following description in connection with the accompanying drawings in which.

Figure 1:
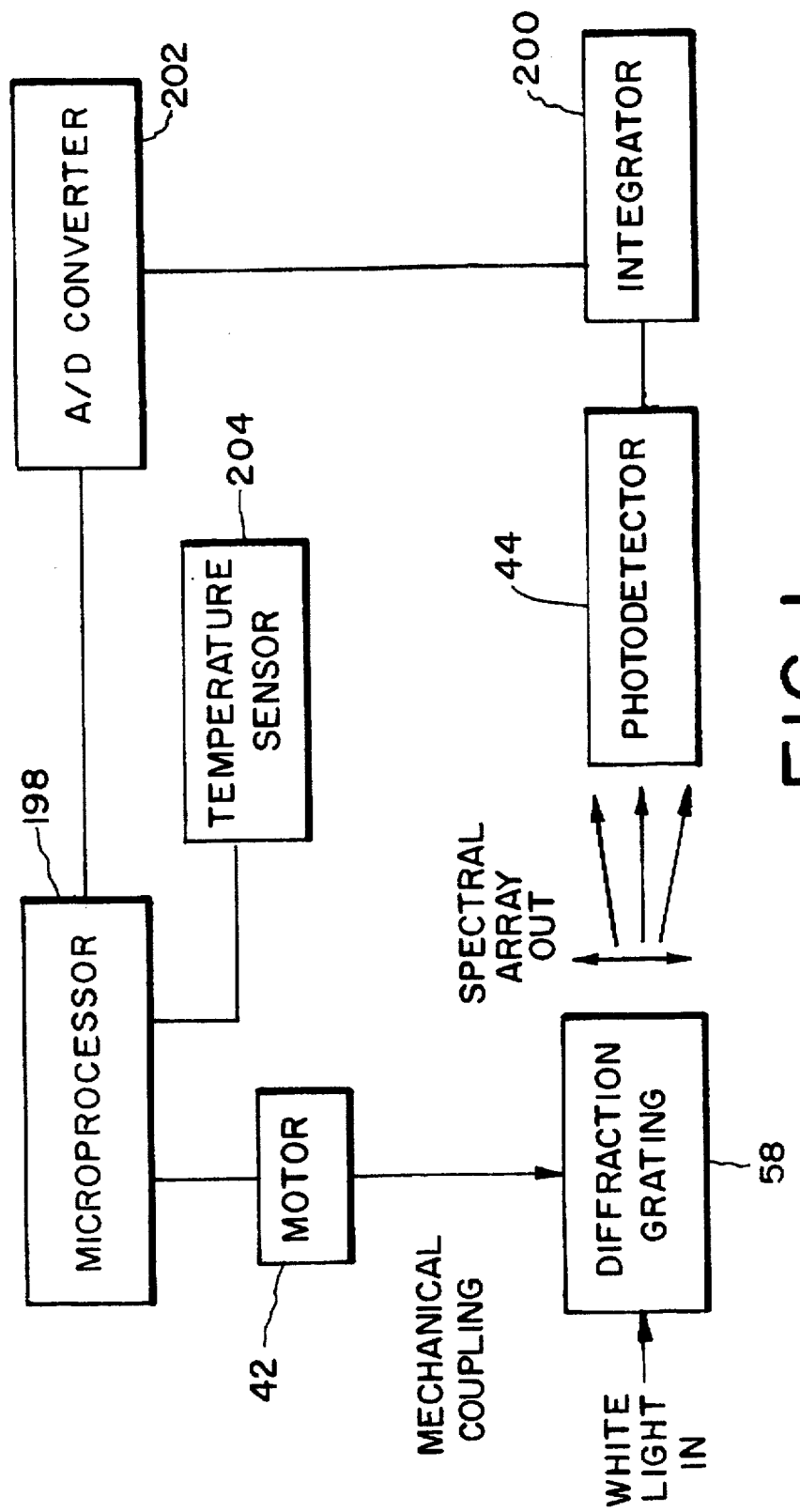
FIG. 1 is a block diagram of a spectrophotometer embodying electronic temperature stabilization in accordance with the invention.
Figure 2:
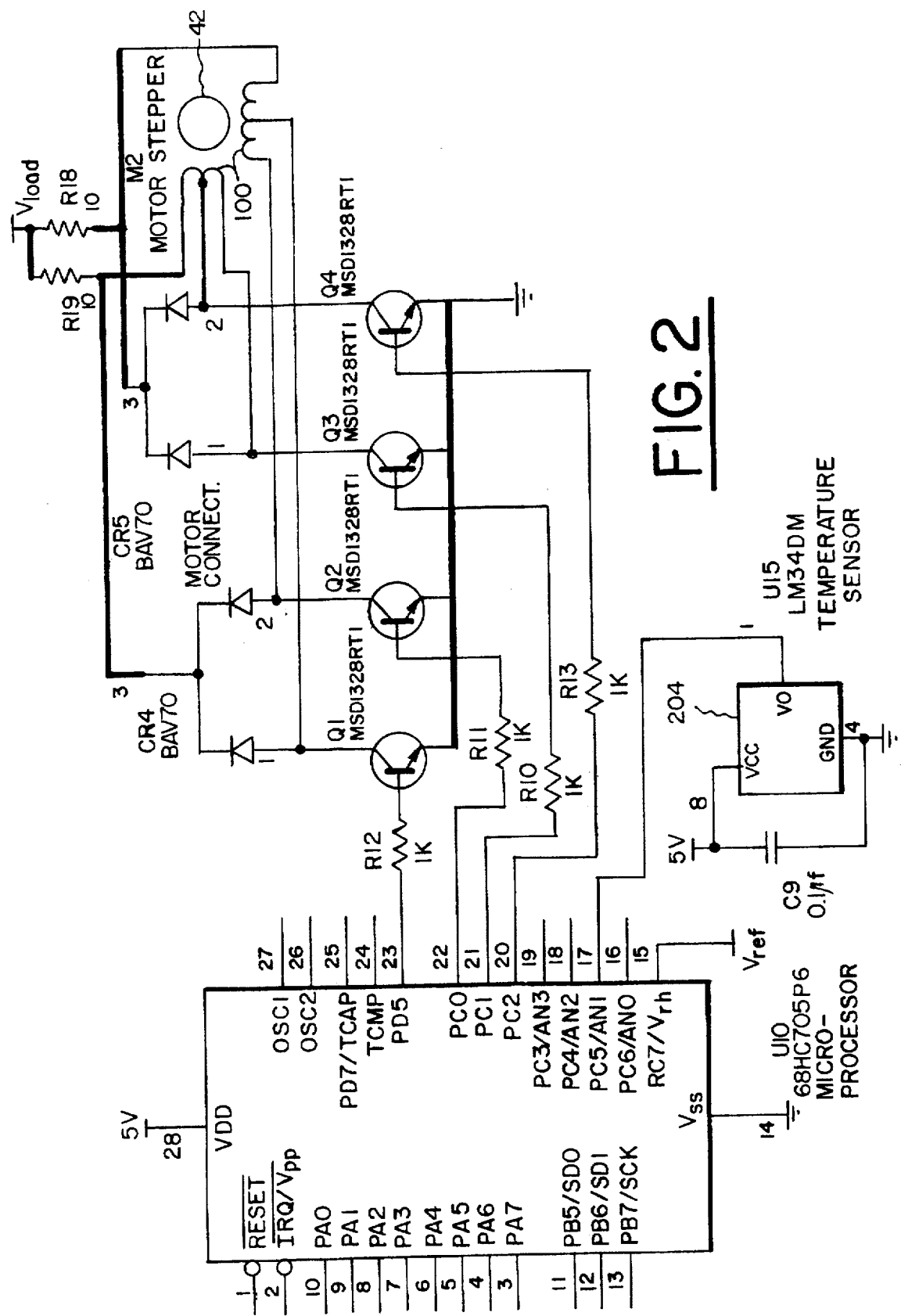
FIG. 2 is a schematic diagram of the motor and motor control circuitry of the spectrophotometer which is utilized in the system show in FIG. 1.

Referring to FIG. 1, there is shown a dispersive element, provided by a diffraction grating, such as grating 58 in the above-referenced International Published Patent Application WO96/12166. This grating is mounted on an arm 152 which is rotated by a motor 42. The motor is a stepper motor having four coils or windings. The same reference numerals are used in the figures hereof as in the referenced International Application. The coils 100 of the motor are shown in FIG. 2. This motor is controlled by a controller, specifically a microprocessor which is mounted on a printed circuit board shown in FIG. 6 of the above-referenced application, as item 66. The arm 152 is illustrated in FIG. 1 hereof as the mechanical coupling, between the motor and the grating. This coupling also includes the motor shaft and other components associated with the arm 152 (see FIG. 6 of the above-referenced International Application).

The grating 58 disperses the light which is being analyzed into its discrete spectral constituents, which are focused on a photodetector 44. The dispersed light provides a spectral array as shown in FIG. 1. The output of the photodetector 44 is electronically analyzed in circuitry including an integrator 200 and digitized in an analog to digital converter 202 to provide an input to a microprocessor 198 which analyzes the data from the converter 202 and provides the output representing the spectral measurements as the motor is stepped so as to measure different wavelengths or wavelength bands or ranges. The microprocessor 198, as shown in FIG. 2, has outputs to four transistors, Q1 through Q4 which provide current to the motor windings 100 from a voltage source indicated as V load through resistors R19 and R18. Diodes CR4 and CR5 are used for suppression of transients. During spectral measurements, the coils receive discrete currents at successive times (in other words, they are activated to produce rotation in steps of the motor) upon completion of the cycle of rotation of the motor, time is available for utilizing the motor as a heat source. Of course, the coils 100 do produce heat when the motor is running. The motor is used as a heat source by controlling the motor so that it does not produce rotation. This is accomplished by turning all of the control transistors Q1 through Q4 on, simultaneously, thereby drawing current through the coils, then the motor is not rotating.

Temperature stabilization is accomplished electronically with the aid of a temperature sensor 204 (a thermistor) which may suitably be mounted on the circuit board 66 in the vicinity (approximately one inch from the motor between the motor and the grating), then a temperature which reflects the temperature of the spectrophotometer is sensed. The temperature sensor is connected as an input to one of the inputs of the microprocessor 198. The output of the temperature sensor is an analog signal. The microprocessor has internal analog to digital conversion and internally provides a digital signal which represents the temperature of the spectrophotometer.

Figure 3:
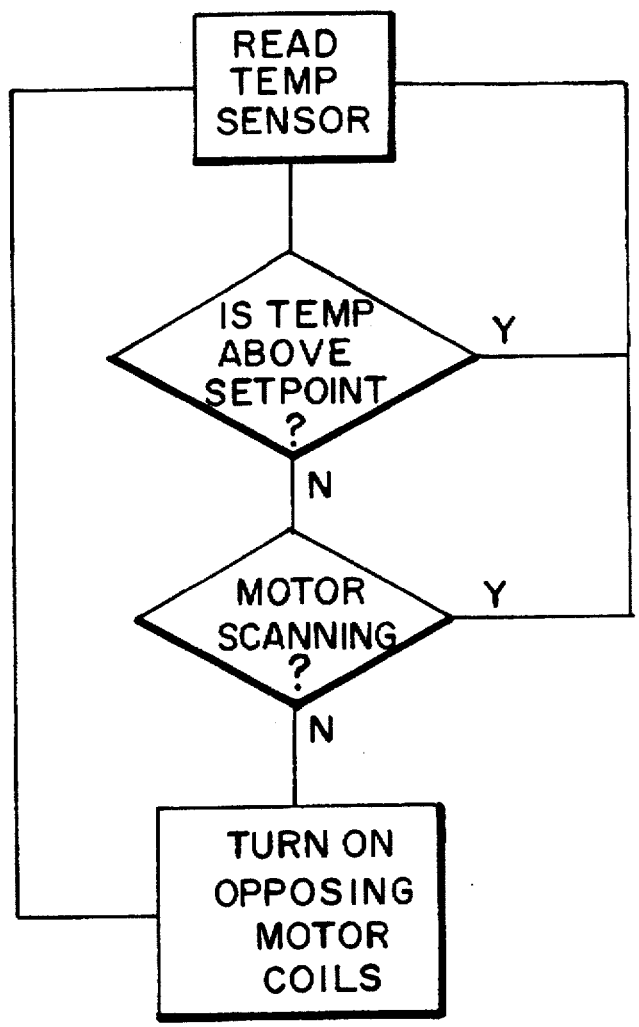
FIG. 3 is a flow chart illustrating the programming of the microprocessor show in FIGS. 1 and 2.

As shown in FIG. 3, the microprocessor is programmed to read the temperature sensor continuously. The program proceeds by determining whether the temperature is below a set point. If the decision is that the temperature is above a set point, then the motor coils are not energized and no heating results. However, there is another decision in the program as to whether or not the motor is scanning, which is determined by whether the microprocessor has been commanded to scan the overall wavelength range of the spectrophotometer and detect the absence of any such commands. When the temperature of the spectrophotometer is below the set point, the microprocessor provides levels which switch on the transistors Q1 through Q4 simultaneously so that heating current passes through the coils 100 without causing the motor to rotate. Accordingly, the spectrophotometer is controlled to achieve a temperature rise and to maintain that temperature by turning on the heating source only when the temperature drops below the set point. It has been found empirically that a set point of approximately 100° F. enables the system to stabilize the temperature of the spectrophotometer shown in the above-referenced international application, at its design temperature, for example, room temperature, during normal operation. It will be appreciated further that retrofitting of a temperature stabilization system embodying the invention requires only the installation of the temperature sensor on the printed circuit board and suitable programming of the microprocessor, thus temperature stabilization may be obtained at low cost and without complex mechanical facilities.

Variations and modifications in the herein described spectrophotometer and temperature stabilization system thereof, within the scope of the invention, will undoubtedly suggest themselves to those skilled in the art. Accordingly, the foregoing description should be taken as illustrative and not in a limiting sense.

I claim:

1. In a spectrophotometer having a dispersive element mechanically actuated by a motor, a temperature stabilization system which comprises a controller connected to the motor for mechanically actuating the dispersive element so as to provide spectral measurements, a temperature sensor thermally coupled to the spectrophotometer, the temperature sensor being connected to the controller for operating the controller to utilize the motor as a heat source when required to increase the temperature of the spectrophotometer and when spectral measurements are not being carried out.

2. The invention as set forth in claim 1 wherein the motor has windings and the controller is a microprocessor having outputs connected to the windings of the motor.

3. The invention as set forth in claim 1 wherein the controller has means utilizing the motor as a heat source, responsive to the temperature sensor and to the operating condition of the motor for applying heating current to the motor without causing mechanical movement of the motor.

4. The invention as set in claim 3 wherein the controller is a programmed microprocessor which provides said means for utilizing the motor as a heat source when not conditioned to actuate the dispersive element, and in response to the temperature sensor.

* * * * *